July 13, 1937.　　　E. A. JOHNSTON ET AL　　　2,086,807
TRACTOR
Filed July 5, 1935　　　5 Sheets-Sheet 3

Inventors
Edward A. Johnston
David B. Baker
Clifford R. Rogers
By V. F. Shumpe
Atty.

Fig. 8
Fig. 7

Inventors
Edward A. Johnston
David B. Baker
Clifford R. Rogers
By V.F. Lavagne
Atty July 13, 1937.  E. A. JOHNSTON ET AL  2,086,807
TRACTOR
Filed July 5, 1935  5 Sheets-Sheet 5

Inventors
Edward A. Johnston
David B. Baker
Clifford A. Rogers
By V. T. Lausagne Atty.

Patented July 13, 1937

2,086,807

UNITED STATES PATENT OFFICE 2,086,807

TRACTOR

Edward A. Johnston, Chicago, David B. Baker, Riverside, and Clifford R. Rogers, Oak Park, Ill., assignors to International Harvester Company, a corporation of New Jersey Application July 5, 1935, Serial No. 29,798

9 Claims. (Cl. 180—17)

The invention relates to tractors.

At the present time the more prominent tractor manufacturers produce several kinds and varieties of tractors to meet different conditions of use. For example, it is a common thing for such a manufacturer to produce a wheel tractor, a full crawler tractor, a semi-crawler tractor, and other types for various farm and industrial purposes. Each tractor so produced has a specially constructed central frame or body, including transmission gearing from the motor to the traction ground supports. Seldom, if at all, is it found in the circumstances described that a common chassis and transmission is provided adapted for use with the different types of traction supports. Such conditions create a difficult manufacturing burden, as it involves great expense to manufacture so many different types of tractors in the same factory.

It would, therefore, be highly desirable to provide a body or chassis embodying the power plant and transmission to the final drive power output shafts, which could be used in common for all of these different types of tractors.

As such common body or chassis structure including the transmission is to be used for both tractors of the wheel and crawler type, it is desirable that an efficient and simple steering control means be provided which will function equally well for steering either type of traction device.

The invention, therefore, more particularly relates to a tractor construction which will provide such a common body or chassis and transmission, including an improved steering control means.

The main object of the invention is generally to provide an improved tractor.

Another important object is to provide a tractor chassis including the power plant and transmission gearing which is adapted to use by a tractor manufacturer as a unit, which will be common to the various types of tractors which the manufacturer produces.

Another object of the invention is to provide an improved compact form of final drive gearing for delivering the power from the variable change speed gear set to the final power out-put shafts that drive the traction supports, which carry the improved chassis.

Still another object is to provide an improved form of steering control in association with the said final drive arrangement for effectively controlling steering movement of the tractor.

It is also an important object to make all transmission parts easily accessible for repair and inspection.

Other important objects will, of course, become apparent to those skilled in this art as the disclosure is more fully made.

Briefly, these desirable objects are attained by providing an improved frame, which frame, at its front end, carries the motor in an improved manner. The middle part of the frame rearwardly of the motor houses the improved variable speed change gear set, providing a wide range of speeds of travel for the tractor. Associated with this middle part of the body and above the change speed gearing is a pulley take-off shaft. Associated with the flywheel of the engine and compactly built into the change speed transmission is a continuously rotating shaft, which is geared to drive a power take-off shaft including a clutch for controlling the same arranged in a housing over the rear part of the frame, just in back of the change speed gear set. The third and rear part of the tractor body comprises a housing containing the improved final drive transmission parts driven from the change speed gear set, said final drive gearing including a novel arrangement whereby the power is divided to be delivered to the two traction devices supporting the opposite sides of the rear end of the tractor body. This final drive arrangement includes clutches carried in housings disposed at the side of the rear part of the body and outwardly thereof for controlling the delivery of driving torque to the opposite traction devices. Associated with the final power out-put shafts of this final drive arrangement are brakes for permitting short steering turns.

The improved tractor is shown, for the sake of illustration, in its preferred embodiment in the accompanying sheets of drawings, wherein:

Figure 9 is a side elevational view, partly in section, to illustrate the mounting of the motor on the front part of the tractor frame and the manner of connecting the motor shaft with the engine flywheel, the section being taken along the line 9—9 in Figure 10, looking in the direction of the arrows;

Figure 10 is a front elevational view of the structure shown in Figure 9, a portion thereof being broken away, to illustrate the manner of mounting the radiator for the engine;

Figure 11 is a detail cross sectional view taken along the line 11—11 of Figure 9, looking in the indicated direction, to illustrate the manner of mounting the front end of the motor; and, Figure 12 is a similar cross sectional view, taken along the line 12—12 of Figure 9, to show the wall separator between the rear end of the engine and the front end of the engine clutch compartment.

In giving the detailed description of the improved tractor construction, the various parts and units thereof will separately be described and, at the end of the specification, a summation will be made to bring out the manner of associating the various units. First of all, there will be described the body, or main frame of the tractor, said frame in effect constituting the backbone of the tractor.

The main frame

The main frame embodies three main parts, as follows: First, a front motor supporting part 20, which preferably is stamped from a sheet of heavy steel; second, an intermediate housing 21 for the change speed gear set and pulley unit; and, lastly, the rear housing 22 for the final drive and steering control parts. The two parts 21 and 22 are preferably cast.

Figures 9, 10, 11, 12:
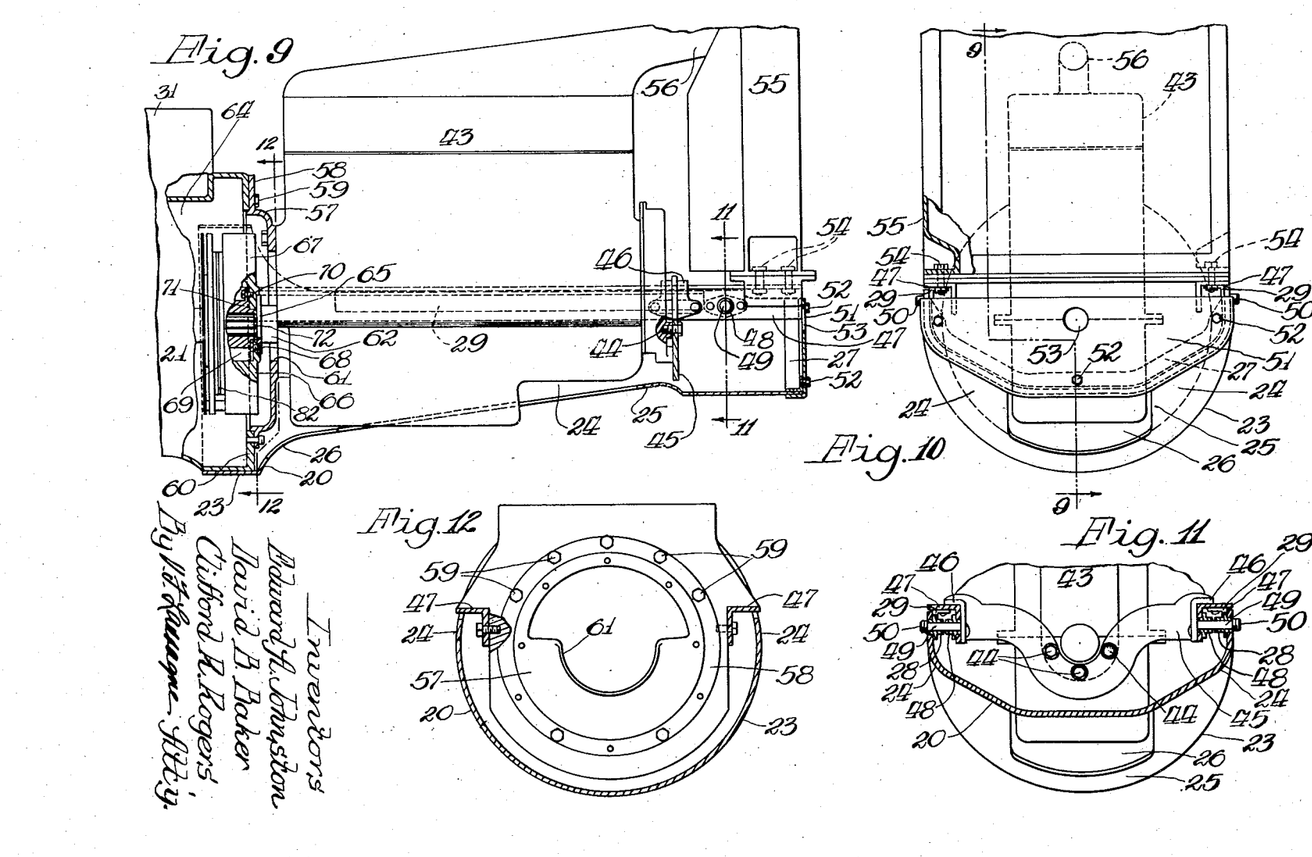

The part 20 is preferably formed in one piece as a heavy sheet metal stamping, as has been stated, said piece at its rear end embodying a circularly formed saddle part 23, into which the similarly formed front end of the middle cast part 21 is fitted. The saddle portion 23 of the part 20 is thereupon bolted permanently by bolts to the part 21. The front piece 20 embodies two longitudinal side walls 24 and a bottom 25, which is formed with a cut-out opening 26. The bottom of the crank case of the motor, which is carried by this part 20, later to be described, extends downwardly through this opening 26. The front end of the frame part 20 carries a U-shaped angle bar 27, which, as shown in Figure 10, is welded to the inner front edges of the side wall portions 24. Near their front ends the side wall portions 24 carry in transverse alignment, a pair of bosses or sleeves 28 having transversely aligned openings for a purpose later to appear. The inside face of the opposite side arms, or walls, 24 have each welded thereto an angle bar 29 providing a horizontal ledge, upon which the motor, later to be described, is carried.

The middle unit 21 is formed as a cast, generally rectangularly shaped box, closed at its bottom, the rear upper portion thereof being flat and having formed therein a large opening 30, while the forward portion of the box 21 is extended upwardly, as at 31, to provide an auxiliary compartment for the pulley take-off, later to be described, said upward extension 31 having side openings formed therein for the purpose of carrying a shaft, as will be later described. The rear transverse wall of the part 21 is extended laterally to form a flange 34 to receive bolts 35 for connecting the part 21 to the rear or final drive housing 22, which, it will be noted, is also substantially rectangular in shape and formed as a cast box, the same being slightly wider than the part 21.

The top of this rear box 22 is closed, said top being formed with a depressed cover portion 36 and a large opening 37 in advance thereof, said portion 36 and opening 37 being surrounded by a machined edge formed with bolt holes, so that an auxiliary cover housing later to be described may be bolted in place to enclose these portions 36 and 37. The rear end of the part 22 on its top side has a machined surface 38 for a purpose later to be described. The opposite sides of the part 22 are formed with a bolt-receiving flange 39 forming side wall portions delineated by said flange to provide at each side of the part 22 transversely aligned openings 40 assembling the final drive unit, later to be described. Centrally between the openings 40 on the longitudinal axis of the part 22 and integral therewith is formed a bearing box structure 41. Between this structure 41 and the front wall of the part 22 is a large space 42, for a purpose to appear later.

The front wall of the part 21 is open to afford communication with the rear portion of the front motor carrying bracket piece 24, and the rear end of the middle box part 21 is open to afford communication with the front open end of the rear box part 22, so that the various units arranged in the three different frame parts may be operatively connected together, as will later appear. From this it can now be seen that a sturdy, three-piece main frame is afforded when the three parts are rigidly bolted together to provide a strong frame or backbone for the tractor. The manner of mounting the motor on the front part 20 will next be described.

The motor mounting

As shown in Figures 9 to 12, inclusive, the motor is designated at 43, the same being of any suitable conventional internal combustion engine type having bolted to its front end, as shown in Figures 9 and 11, by bolts 44, a transverse plate bracket 45 having its opposite ends formed with seats 46 to carry the ends of said bracket 45 on longitudinally disposed angle bars 47. These angle bars 47 run substantially the length of the motor and are so arranged that their horizontal flanges rest on the horizontal flanges of the angle bars 29 welded to the side arms 24. When the motor is so positioned, the lower end thereof projects through the opening 26 in the bottom of the part 20, as shown in Figure 9.

The angle bars 47 adjacent their front ends carry fixed sleeves 48 in line with the sleeves 28 heretofore described, and, as shown in Figure 11, dowel-pins 49 are driven transversely through the adjacent sleeves 28 and 48, further to rigidly connect the motor to the side arms 24. The ends of these dowels are formed with an enlargement that is threaded, as shown at 50, whereby a suitable puller device may be coupled thereto to permit removal of the dowel-pins when it is desired to remove the motor. The open front end of the part 20 adjacent the angle bar 27 is closed by a cap plate 51 secured by bolts 52 to the vertical flange of the said angle bar 27, said plate having an opening therein numbered 53 for the insertion of a starting crank.

The front end of the angle bars 47 have bolted thereto, as at 54, a radiator 55 in communication, by means of a conduit 56, with the motor 43 in a conventional manner to circulate cooling fluid through the motor.

The rear end of the motor includes the usual bell housing plate 57, as shown in Figures 9 and 12, which bell housing plate includes a bolt circle 58 adapted to receive bolts 59 for securing said bell housing plate 57 of the motor 43 to a bolt circle 60 formed as the front end of the middle frame unit 21. This bell housing plate 57 is formed with an opening 61, through which is projected the crank shaft 62 of the engine 43.

As shown in Figure 9, the part 21 has a bolt circle 60 at its front end and rearwardly thereof is an engine clutch compartment 64, which is dry. The rear end of the engine crank shaft 62, as shown in Figure 9, is formed with an upset flange 65 fitted into the recessed hub 66 of the engine flywheel 67, said flange 65 being secured by bolts 68 to said recessed hub 66, as shown. The rear face of the flywheel is hollow, as shown at 69, and to the rear face of the flywheel in this hollowed-out portion 69 is secured, by means of bolts 70, a plate 71, which is in the form of a sleeve splined to the front end of a main driving shaft 72, said sleeve plate 71 enclosing a bearing 73 for carrying the front end of said main driven shaft 72.

A conventional engine clutch 82 is associated with the flywheel 67 for controlling a change speed set located in the frame part 21.

Figure 1:
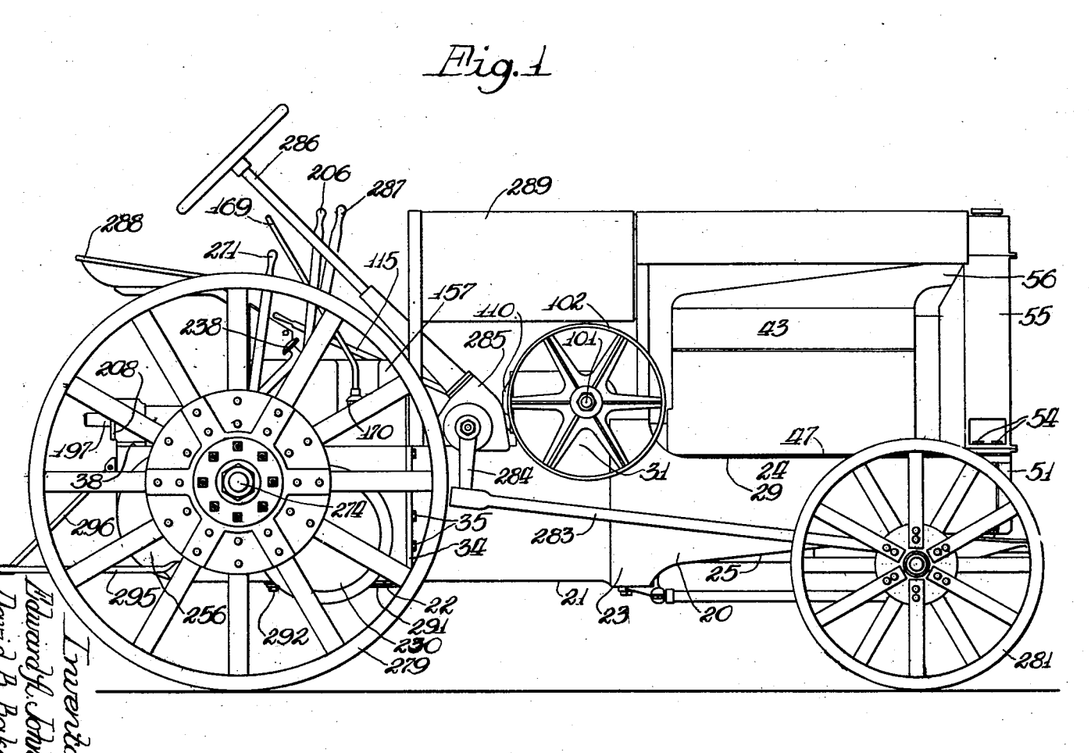
Figure 1 is a general side elevational view of the tractor.

The upper part of the clutch compartment 64 carries a transverse shaft 101, which projects out of the compartment to carry the pulley wheel 102 shown in Figure 1.

Figures 7, 8:
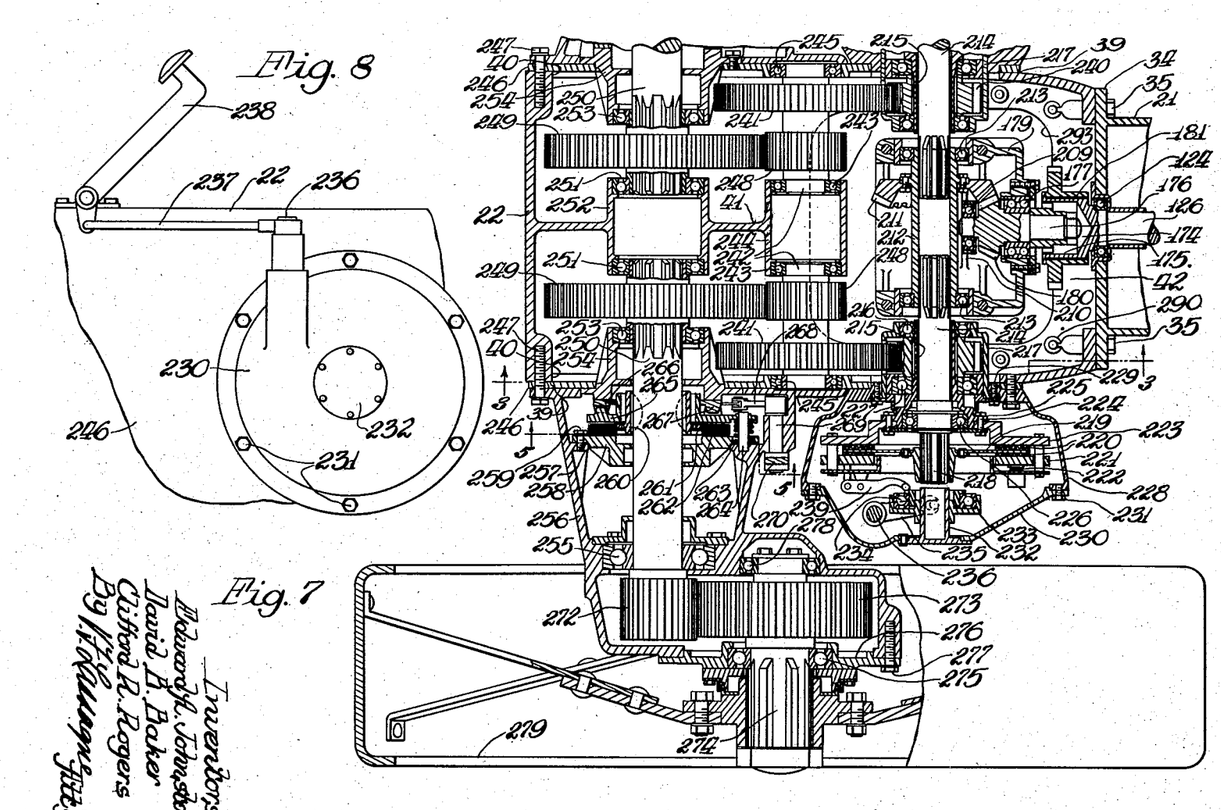
Figure 7 is a horizontal plan, sectional view through the rear end of the tractor, showing the final drive gearing, both final power output shafts being shown although only one traction drive device is illustrated.
Figure 8 is a side elevational detail view illustrating the outside of one of the steering clutch control casings with the control lever mechanism associated therewith.

The rear end of a final power output shaft 126 of the change speed set, which may be of any desired form, is extended rearwardly of its bearing 124 and is enlarged, as shown in Figure 7, to form a hollow hub 174, said hub being formed on its interior with a clutch spline 175 of any appropriate form for detachably securing a power extension shaft 176 to the shaft 126, so that in operation the coaxially arranged shafts 176 and 126 operate as a single shaft. The extension 176 is appropriately journaled in bearings 177 carried in a collar 178 formed in a bearing bracket support 179 located in the space 42 forward of the bearing box structure 41, and supported in a manner later to be described, on the floor of the final drive frame housing part 22. The rear end of the shaft extension 176 carries a bevel pinion 180, which bevel pinion is the final power delivery gear from the change speed unit. The exterior of the hub 174 carries a suitable bearing 181 for mounting an idler gear 182 that plays down into the oil contained in the casing 22 to dip the oil and carry it upwardly for lubricating certain gearing next to be described, which gearing constitutes the operative connections from the shaft 72 for operating a power take-off shaft.

Figure 3:
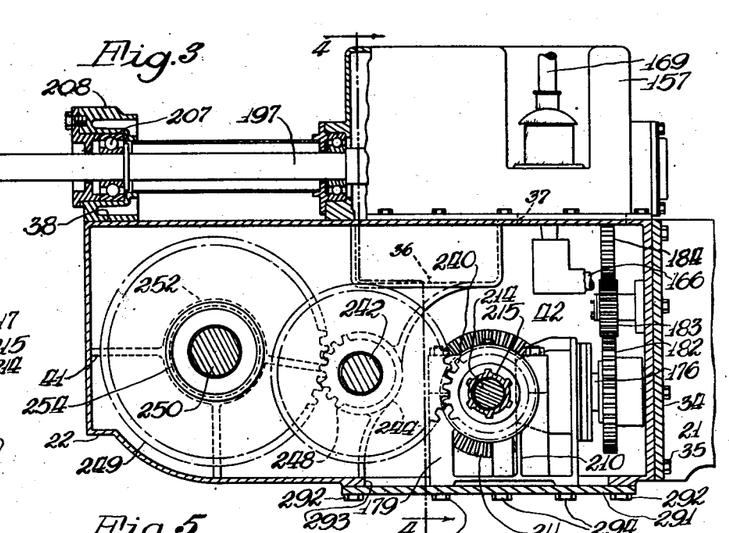
Figure 3 is a transverse sectional view, showing in side elevation the final drive gearing in the rear unit part of the frame, taken along the line 3—3 of Figure 7, looking in the direction of the arrows.
Figure 4:
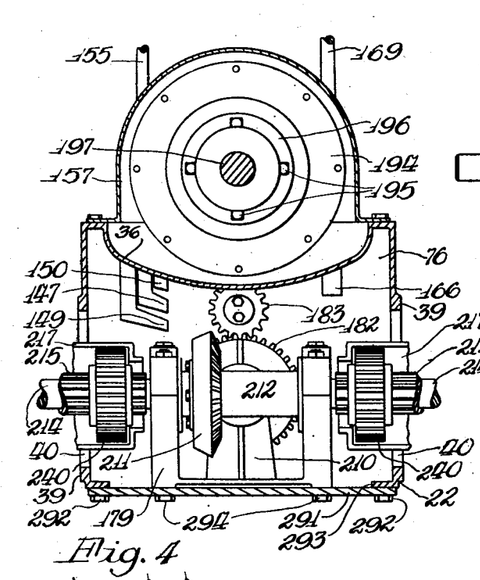
Figure 4 is a vertical cross sectional view through the final drive transmission parts, taken along the line 4—4 shown in Figure 3 and looking in the indicated direction.

As shown in Figure 9, the power take-off shaft is really the main power shaft 72 rigidly connected to the motor flywheel 67. The rear end of said shaft, as shown in Figure 3, carries splined fast thereon a spur gear 183 meshing the idler oil dip gear 182 and also a large spur gear 184 splined fast on a shaft carried in bearings at its front end in the cover 157 heretofore described. As these three gears 184, 183, and 182 all mesh, it can now be seen that the oil dipper gear 182 serves to pick up the oil and distribute it over the peripheries of each of these three gears.

The rear end of said shaft which carries the gear 184 also carries a clutch 194 for coupling said shaft with a coaxially disposed shaft 197 which includes a hub extension 196 serving as a bearing carrier for the front end of the shaft 197. When a lever 206 is swung rearwardly, as shown in Figure 1, conventional linkage is operated to release the clutch plate 194 to stop rotation of the shaft 197.

The shaft 197 is the power take-off shaft, as shown in Figure 3, said shaft being carried at its rear end in a bearing 207 in a carrier 208 appropriately mounted in a box secured on the machined surface 38 formed on top of the rear body part 22, which has been heretofore described. This shaft extends rearwardly beyond the rear wall of the tractor body, so that it can be made available for easy connection and disconnection with respect to auxiliary devices adapted to be driven from the power of the tractor.

*Final drive and steering control gearing*

Looking to Figure 7, it will be seen that the rear end of the shaft 176 is carried in a bearing 209 mounted in a partition 210 included in the bracket 179. The bevel gear 180 heretofore described is in mesh with a bevel gear 211 made fast to a sleeve 212 arranged transversely in the frame 179 and having its opposite ends journaled in bearings 213. This sleeve 212 has its ends securely splined to the inner spline ends of a pair of transversely aligned power distributing shafts 214. The inner ends of the shafts 214 are loosely turnable in sleeves 215, whose inner ends are journaled on bearings 216 carried in collars 217 appropriately located at the forward ends of the openings 40 in the rear housing part 22.

The outer ends of the shafts 214 extend laterally out of said openings 40 and have their outer ends formed with splines 218 for fixed fastening thereto a clutch disk 219 having opposite friction facings 220. This clutch construction on each side of the tractor includes a pressure plate 221 normally pressed by springs 222 to engage the clutch plate 219 on each side of the tractor with a plate 223 secured by a circle of bolts 224 to the hub extension 225 of the sleeves 215. The outer ends of these hubs 225 are journaled in bearings 226 to carry the shafts 214 in the manner shown in Figure 7. The outer end of each sleeve 215 is further journaled on bearings 227 carried in the collars 217, as shown. A housing 228 encloses the clutch structure just described on each side of the part 22, the inner edge of said housings 228 having bolt circles to receive bolts 229 for securing said housings to the bolt circle flange 39 surrounding the openings 40 on the sides of the box part 22.

These housings 228 have removable covers 230 secured thereto by a bolt circle 231, each cover 230 carrying a central trunnion 232 on which is slidably mounted a clutch release collar 233 including a clutch release bearing 234, said collar 233 with the bearing 234 being slidable on the trunnion 232 by means of a lever 235 operable from a clutch release shaft 236, said clutch release shaft 236 being vertically disposed in the cover 228 and, as shown in Figure 8, being connected with linkage 237 to a foot pedal 238, there being two such foot pedals, as there are two such clutches 219 arranged one on the outer end of each shaft 214. When a foot pedal 238 is operated, the shaft 236 is rocked to move the clutch release member 233 inwardly to press against the clutch release levers 239, which serve to release the pressure plate 221 to disengage the clutch 219 from the plate 223.

Each sleeve 215 within the carrier 217 has splined thereto a spur gear 240, said spur gears, respectively, on opposite side of the tractor meshing with large spur gears 241 carried on stub shafts 242, respectively having their inner ends journaled in bearings 243 in a bearing box 244 which is the forward end of the bearing box structure 41 formed integrally with the bottom of the housing part 22. The outer ends of said stub shafts 242, which are transversely disposed, are carried in bearings 245 mounted in plates 246 over the openings 40 and secured by a ring of bolts 247 to the flanges 39 on the part 22. The inner end of each shaft 242 carries a spur gear 248 meshing large reduction gears 249 splined on the inner ends of a pair of transversely aligned, final power output shafts 250 disposed transversely and carried at their inner ends on bearings 251 mounted in a bearing box 252 which is the rearward end of the bearing box structure 41, formed integrally with the part 22. Said separately and independently rotatable shafts 250 are further carried in bearings 253 journaled in carriers 254 mounted in the plates 246 at the sides of the part 22 heretofore described. These shafts 250 protrude laterally of the sides of the part 22 and are carried adjacent their outer ends in bearings 255 mounted in a cover carrier 256, as shown in Figure 7, said cover carriers including flanges 257 for carrying plates 258 secured by bolts 259 to said flange 257, the shafts 250 extending through said plates 258.

Keyed to each shaft 250 are hubs 260, which carry clutch brake plates 261 having opposite friction facings 262 normally held by spring means 263 out of engagement with the inner faces of the plates 258, said springs being carried around studs 264 carried in pressure plates 265. Between the pressure plates 265 and the outer edge of the carriers 254 is arranged a cam plate 266 having cams 267, so that when the plate 266 is turned by the linkage 268, the cams force the plates 265 laterally outwardly to engage the clutch brake disk 261 frictionally with the stationary plate 265, thus braking further rotative movement of the respective shafts 250.

Figure 5:
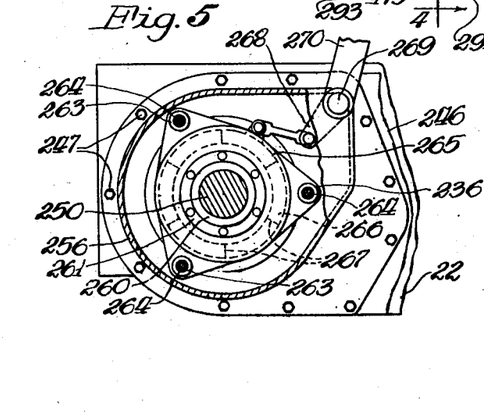
Figure 5 is a longitudinal side sectional view, showing one of the steering control brakes, taken along the line 5—5 of Figure 7, looking in the direction of the arrows.
Figure 6:
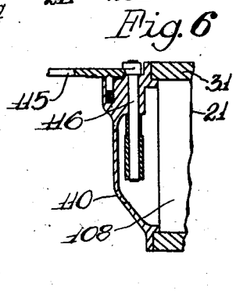
Figure 6 is a detail horizontal sectional view showing the manner of mounting the control lever for the clutch to regulate operation of the pulley take-off shaft.

The linkage 268 is operable from a rockshaft 269 appropriately journaled in the cover 266 and in turn operable by a link 270 (see Figure 5) that leads to a brake hand lever 271. It is to be understood that there are two such brake hand levers 271, one for applying each clutch brake 261, respectively associated with each shaft 250 on each side of the tractor.

As shown in Figure 7, the outer end of each final power output stub shaft 250 carries outwardly of its bearing 255 a spur gear 272 in mesh with a reduction gear 273, fast on a stub axle 274 journaled on bearings 275 mounted in a carrier plate 276 secured by a circle of bolts 277 to the outer open end of the housing 256. The inner ends of the stub axle shafts 274 are carried in bearings 278 appropriately mounted in a recess in an extension of the housing 256. Secured fast to the outer end of each stub axle 274 is a traction supporting device in the form of a traction wheel 279.

Figure 2:
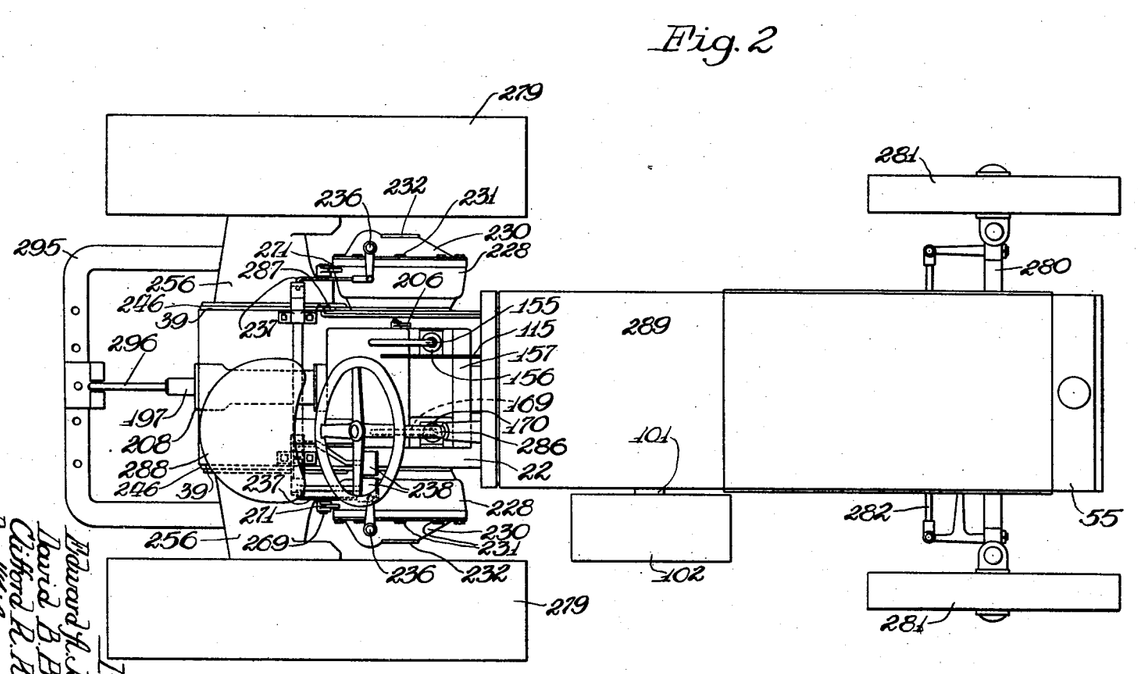
Figure 2 is a general plan view thereof.

As shown in Figures 1 and 2, the front end of the tractor is carried on an axle 280 of the auto-steer type, the ends of said axle carrying steering wheels 281 turnable by linkage 282 from a pitman 283 operable from a crank 284 by the usual steering gears enclosed in a housing 285 and operated by a hand wheel-turned shaft 286, the housing 285 for the steering wheel and columns being appropriately mounted on the intermediate frame part 30, as shown in Figure 1.

The engine clutch 82 is released by a hand lever 287 appropriately connected by connections, not shown, to operate the clutch. A seat 288 for the driver of the tractor is appropriately located over the rear frame part 22 in a position accessible to the various control levers heretofore described. A fuel tank 289 is appropriately supported over the part 30 at the rear of the engine 43, as shown in Figure 1.

As shown in Figure 7, the forward end of the floor of the rear frame part 22 is formed with upstanding bosses 290 for securing thereto a bottom plate 291 (see Figure 3) secured by bolts 292 to the bottom of the part 22 adjacent the periphery of a large opening 293 formed in said bottom or floor of said part 22 and communicating with the space 42. This plate 291 carries as a unit the frame 179, which carries the sleeve 212 and gear set associated therewith, said frame 179 being secured by bolts 294 to said bottom cover plate 291. Obviously now, when the shafts 214 are slid out of the sleeves 212, the unit carried on the plate 291 can be slid downwardly out of the body part 22 for inspection and repairs.

The rear side edges of the rear part 22, as shown in Figures 1 and 2, carry in any appropriate manner a U-shaped draw-bar 295 supported from a hanger 296.

This concludes the detailed description of the parts. A summary of the operation thereof will next be given.

Use and operation

In assembling the tractor the three frame parts 20, 21, and 22 are bolted together in the manner described to form the main frame or back bone or the tractor. The motor 43 is then set down with its bolt flanges 47 on to the side rails 29 secured to opposite sides of the motor supporting bracket frame piece 20. The front end of the motor is then secured by the dowels 49 in the manner shown in Figure 11 and the rear bell-housing, plate 57, of the motor is then bolted to the front bolt circle flange 60 formed at the front of the change speed box 21. The clutch compartment 64 contains the engine clutch assembly, and the part 21 contains the change speed gear transmission assembly. The rear part 22 contains the final drive and steering control parts and mounted thereabove is the box 157 containing the power take-off shaft.

By manipulating the gear shift levers 155 and 169 various speeds can be delivered by the change speed gearing to the final bevel gear 180.

As shown in Figure 7, the final bevel gear 180 delivers driving torque to the sleeve 212, said sleeve being turned by the pinion 211. In turn, the two coaxially arranged, transverse shafts 214 carry at their outer ends, the steering clutches 219.

These clutches 219 are normally engaged to drive the respective plates 223 and sleeves 215, whereupon the gears 240 are rotated. It can now be seen that if the right hand clutch 219 is engaged and the left hand clutch 219 is disengaged through its clutch release shaft 236 that the power of the engine through the transmission will all be delivered to the right hand spur gear 240 and that the left hand gear 240, because it is disengaged from its clutch 219, will not transmit power. Consequently the tractor will be driven by power to the left for a left hand steering turn. This steering movement, of course, can be augmented by operation of the usual hand steering column 286 and the auto steer front wheel supports 281. Thus by manipulating the clutches 219, the tractor can be steered either to the left or to the right, and by variously slipping these clutches, such steering movements can be controlled as desired by the tractioneer.

It will now be understood that the spur gears 240 thus simultaneously deliver power to the reduction gears 241 or divide the power from one side to the other. Rotation of the gears 241 turns the gears 248 and the mesh reduction gears 249 to effect the operation of the final power output shafts 250 which in turn are geared by gears 272 and 273 to operate the tractor driving supports which in the present embodiment of the tractor are in the form of wheels 279.

For the purpose of making real short turns, the disk brakes 261 may be manipulated from the hand levers 287 independently of each other to augment the declutching action of the steering clutches 219. These brakes 261 then effectively assist the clutches 219 in cutting off all driving torque on one side of the tractor or the other and make short turns possible.

A study of Figure 7 shows that the clutches 219 are readily removable, the same being true of the box 179. In high speed travel it is found that steering turns are not entirely feasible with these clutches and, therefore, in such conditions of practice the clutches will be removed along with the bracket part 179 and in lieu thereof a conventional differential unit will be operatively associated with the jack shafts 214, thereby providing effective steering control at the higher speed of travel. In other words the tractor design is such that a cage carrying a standard differential and bevel gear fits into the space occupied by the bracket 179 for the condition of use just described.

By means of the various cover closed openings all of which covers are removably attached, as is obvious, easy removal and assembly of the gear parts can conveniently be accomplished. The units supported by the bracket 179 are very readily removed by merely taking off and lowering the bottom plate 291.

When the master engine clutch 82 is released, the brake 99 is automatically applied to stop the inertia of momentum that tends to continue rotation of the change speed gears. This is a very desirable feature.

From this detailed description, it can now be appreciated that an improved tractor has been provided which embodies various novel features of construction that attain all of the desirable objects heretofore mentioned.

For example, the steering by driving gearing arrangement in the final compartment 22 used in lieu of the usual tractor differential makes it possible to convert this tractor into a crawler type of tractor by substituting crawler devices for the wheels 279 herein disclosed. This type of steering and driving control, of course, is the most practicable for crawler tractors and it is also advantageous even in wheel tractors, as it makes for a very sensitive and efficient steering control so that either long or short pivot turns can easily be effected.

It is intended to cover herein all changes and modifications of the preferred embodiment herein disclosed which do not depart from the spirit and scope of the invention hereinafter claimed.

What is claimed is:

1. In a tractor of the class having a longitudinal body with the rear part thereof carried on a pair of opposite traction supports and the forward part carrying a motor and change speed gear set, said rear part comprising a final drive transmission box having an open bottom, the combination with the transmission box of a cover plate detachably secured to the transmission box to close said open bottom, said plate carrying supports for journaling a pair of transverse coaxial power distribution shafts including a gear driven from said change speed gear set, and means for distributing power from said shafts to drive the traction supports, the shafts being removable endwise from the sides of the transmission box to permit removal of the bottom plate and the parts carried thereby.

2. In a tractor of the class having a longitudinal body with the rear part thereof carried on a pair of opposite traction supports and the forward part carrying a motor and change speed gear set, said rear part comprising a final drive transmission box having an open bottom, the combination with the transmission box of a cover plate detachably secured to the transmission box to close said open bottom, said plate carrying supports for journaling a transverse sleeve including a pair of transverse coaxial power distribution shafts and a gear on the sleeve driven from said change speed gear set, and means for distributing power from said shafts to drive the traction supports, the shafts being removable endwise from the sides of the transmission box to permit removal of the bottom plate and the sleeve carried thereby as a unit.

3. In a tractor of the class having a longitudinal body with the rear part thereof carried on a pair of opposite traction supports and the forward part carrying a motor and change speed gear set, said rear part comprising a final drive transmission box having an open bottom, the combination with the transmission box of a cover for said open bottom carrying supports for journaling a pair of transverse coaxial power distribution shafts, a carrying sleeve for mounting the shafts and splined thereto for driving the shafts, a gear driven from said change speed gear set and mounted on the sleeve to drive same, the shafts protruding endwise from the sides of the transmission box, normally engaged steering and driving clutches respectively carried on said shafts outwardly of said transmission box, and means driven from said clutches for distributing power from the shafts to drive the traction supports.

4. In a tractor of the class having a longitudinal body with the rear part thereof carried on a pair of opposite traction supports and the forward part carrying a motor and change speed gear set, said rear part comprising a final drive transmission box, the combination with the transmission box having an open bottom, of a cover plate for closing said open bottom and carrying supports for journaling a rotatable sleeve for driving a pair of transverse coaxial power distribution shafts, said sleeve including a gear driven from said change speed gear set, the shafts carrying respective clutches exterior of the sides of the transmission box, means driven from the clutches and located inside the transmission box to drive the traction supports, said clutches being normally engaged, and operator controlled means for separately slipping or releasing said clutches.

5. In a tractor of the class having a longitudinal body with the rear part thereof carried on a pair of opposite traction supports and the forward part carrying a motor and change speed gear set, said rear part comprising a final drive transmission box, the combination with the transmission box of means therein for carrying a transverse quill journaled therein and driven from the change speed gear set, a pair of coaxial shafts drivingly connected to said quill, the outer ends of said shafts extending laterally beyond the sides of said transmission box and carrying normally engaged clutches, a cover housing secured to each of the transmission box sides to enclose said clutches and including means to release said clutches, sleeves around said transverse shafts driven by said clutches and extending from within the cover housings to a point inside the transmission box, reduction gears mounted in opposite sides of the transmission box and respectively driven from said sleeves, and final power output shafts driven by said reduction gears to drive the traction supports.

6. In a tractor of the class having a longitudinal body with the rear part thereof carried on a pair of opposite traction supports and the forward part carrying a motor and change speed gear set, said rear part comprising a final drive transmission box, the combination with said transmission box of means therein for journaling a transverse quill driven from the change speed gear set, a pair of coaxial shafts drivingly connected to said quill, the outer ends of said shafts extending laterally beyond the sides of said transmission box and carrying normally engaged clutches, a cover housing secured to each of the transmission box sides to enclose said clutches and including a removable cover plate carrying means to release said clutches, sleeves around said transverse shafts driven by said clutches and extending from within the cover housings to a point inside the transmission box, reduction gears in opposite sides of the transmission box and respectively driven from said sleeves, final power output shafts supported in said transmission box and driven by said gears, said final shafts respectively extending laterally outwardly of the transmission box to drive the traction supports, and brakes operatively associated with the power output shafts.

7. In a tractor of the class having a longitudinal body with the rear part thereof carried on a pair of opposite traction supports and the forward part carrying a motor and change speed gear set, said rear part comprising a final drive transmission box, the combination with said transmission box of means for journaling a transverse quill driven from the change speed gear set, a pair of coaxial shafts drivingly connected to said quill, the outer ends of said shafts extending laterally beyond the sides of said transmission box and carrying normally engaged clutches, a cover housing secured to each of the transmission box sides to enclose said clutches, means to release or slip said clutches independently, sleeves around said transverse shafts driven by said clutches and extending from within the cover housings to a point inside the transmission box, reduction gears in opposite sides of the transmission box and respectively driven from said sleeves, a pair of coaxial transverse final power output shafts driven by said gears to drive the traction supports, and a bracket structure formed in the rear end of the transmission box including bearings for journaling the inner ends of said final shafts.

8. In a tractor of the class having a longitudinal body with the rear part thereof carried on a pair of opposite traction supports and the forward part carrying a motor and change speed gear set, said rear part comprising a final drive transmission box, the combination with the transmission box of means for journaling a transverse quill and driven from the change speed gear set, a pair of coaxial shafts drivingly connected to said quill, the outer ends of said shafts extending laterally beyond the sides of said transmission box and carrying normally engaged clutches, a cover housing secured to each of the transmission box sides to enclose said clutch plates and respectively including means for independently releasing said clutches, sleeves around said transverse shafts driven by said clutches and extending from within the cover housings to a point inside the transmission box, reduction gears in opposite sides of the transmission box and respectively driven from said sleeves, a pair of transversely aligned final power output shafts carried in the transmission box and driven by said gears to drive the traction supports, separate brakes operatively associated respectively with the power output shafts, and means for separately applying said brakes.

9. In a tractor of the class having a longitudinal body with the rear part thereof carried on a pair of opposite traction supports and the forward part carrying a motor and change speed gear set, said rear part comprising a final drive transmission box, the combination with said transmission box of means for journaling a transverse quill driven from the change speed gear set, a pair of coaxial shafts drivingly connected to said quill, the outer ends of said shafts extending laterally beyond the sides of said transmission box and carrying normally engaged clutches, a cover housing secured to each of the transmission box sides to enclose said clutches and including means to release said clutches, sleeves around said transverse shafts driven by said clutches and extending from within the cover housings to a point inside the transmission box, reduction gears in opposite sides of the transmission box and respectively driven from said sleeves, a pair of transversely aligned final power output shafts driven by said gears and extending outwardly of the sides of the transmission box to drive the traction supports, and brakes operatively associated respectively with the power output shafts outside the transmission box.

EDWARD A. JOHNSTON.
DAVID B. BAKER.
CLIFFORD R. ROGERS.